United States Patent [19]
Wieser

[11] Patent Number: 5,387,096
[45] Date of Patent: Feb. 7, 1995

[54] REMOVABLE INSERT FOR CASTING MOLDS, AND CASTING MOLD FOR PRODUCING MOLDED PARTS

[76] Inventor: Marianna Wieser, Hofweg 43, D-8780 Gemünden/Main, Germany

[21] Appl. No.: 81,337
[22] PCT Filed: Dec. 19, 1991
[86] PCT No.: PCT/EP91/02461
   § 371 Date: Jul. 29, 1993
   § 102(e) Date: Jul. 29, 1993
[87] PCT Pub. No.: WO90/08022
   PCT Pub. Date: Jul. 26, 1990

[30] Foreign Application Priority Data

Dec. 21, 1990 [DE] Germany .............. 4041330

[51] Int. Cl.6 .............................. B29C 33/00
[52] U.S. Cl. .................. 425/190; 249/102; 425/192 R; 425/577
[58] Field of Search ............ 249/102, 165; 264/318; 425/190, 192 R, 577, DIG. 58

[56] References Cited

U.S. PATENT DOCUMENTS

| | | | |
|---|---|---|---|
| 812,336 | 2/1906 | Glatfelter | 249/102 |
| 1,292,986 | 2/1919 | Ambursen | 249/102 |
| 3,387,334 | 6/1968 | Belanger et al. | 425/577 |
| 3,871,611 | 3/1975 | Taketa | 249/102 |
| 4,202,522 | 5/1980 | Hanas et al. | 249/102 |
| 4,515,342 | 5/1985 | Boskovic | 425/577 |
| 4,551,084 | 11/1985 | Lake | 249/102 |
| 4,775,130 | 10/1988 | Von Holdt | 425/577 |
| 4,861,254 | 8/1989 | Takeuchi | 425/190 |
| 4,917,902 | 4/1990 | Slocum et al. | 425/553 |
| 4,923,388 | 5/1990 | Nakamura et al. | 425/577 |

FOREIGN PATENT DOCUMENTS

WO90-008022 7/1990 WIPO .

*Primary Examiner*—Charles S. Bushey
*Attorney, Agent, or Firm*—Frishauf, Holtz, Goodman & Woodward

[57] ABSTRACT

The invention relates to a removable insert for casting molds having a fastening screw for fastening the insert in the mold hollow, which screw can be moved to the fastening position by means of a screwdriver engaging an engagement region. It is provided that the engagement region of the fastening screw is oriented toward the mold hollow, and the fastening screw can be anchored in the inner wall of the mold hollow, that the insert has the cavity for the fastening screw, in which cavity the fastening screw is supported and which Cavity is accessible from the mold hollow to the screwdriver, and that the cavity receiving the fastening screw is closable in an undercut-free manner with respect to the mold hollow. The invention also relates to casting molds, equipped with such inserts, for producing workpieces.

9 Claims, 4 Drawing Sheets

REMOVABLE INSERT FOR CASTING MOLDS, AND CASTING MOLD FOR PRODUCING MOLDED PARTS

FIELD OF THE INVENTION

The invention relates to a removable insert for casting molds.

It also relates to a casting mold for producing molded parts with inserts.

DESCRIPTION OF THE PRIOR ART

Particularly for the injection molding process, molds already exist, the cavity of which is made variable by the use of inserts, in such a manner that workpieces of one and the same basic shape, but in which in certain regions of the workpiece various shapings result, depending on the intended use, can always be produced with such a casting mold. With one and the same basic mold, housings for various television sets can thus be produced by injection molding, having substantially the same basic shape but differing in their details; for instance, depending on the model of television set, they have to be provided with recesses at different locations.

To produce such recesses, inserts corresponding to the shape of the desired recess must be provided in the mold cavity of a corresponding injection mold. To install such inserts, the molds were previously drilled from the outside, and the insert then bolted down firmly with a screw introduced through the bore from the outside. With this kind of procedure, although the shape of the insert that defines the shape of the workpiece is unimpaired, nevertheless the bores made from the outside of the mold entail undesirable engineering expense and setup times and may possibly interfere with the installation of tempering conduits and the like.

The object of the present invention is to create a removable insert for casting molds of the type involved here, which can be installed in a simple manner from the inside of the casting mold, yet in which the fastening elements of the insert do not impair the shape of the insert or interfere with the structure or operation of the mold.

The construction so defined is distinguished by the fact that its fastening elements do not impair the shape of the insert or the structure and operation of the mold, and therefore such inserts can be advantageously used to achieve various shapes in certain regions of otherwise identical workpieces, or can also be used as construction elements of the molds themselves, examples being guide elements, locks, diagonal-tension elements, thrust pieces, and the like.

Inserts according to the present invention are also especially advantageous in conjunction with C C technology, that is, computer-aided mold design, in which match plates can be economically machined only from five sides, while machining from the back cannot be performed economically. The inserts according to the present invention, which can be installed from the front, are especially advantageous precisely for this use.

However, the invention also resides in a casting mold with inserts of the type defined by the foregoing claims. Inserts installed in opposed mold halves can supplement one another in a sealing manner, or mold wall parts can cooperate sealingly with such inserts.

BRIEF FIGURE DESCRIPTION

DETAILED DESCRIPTION

Figure 1:
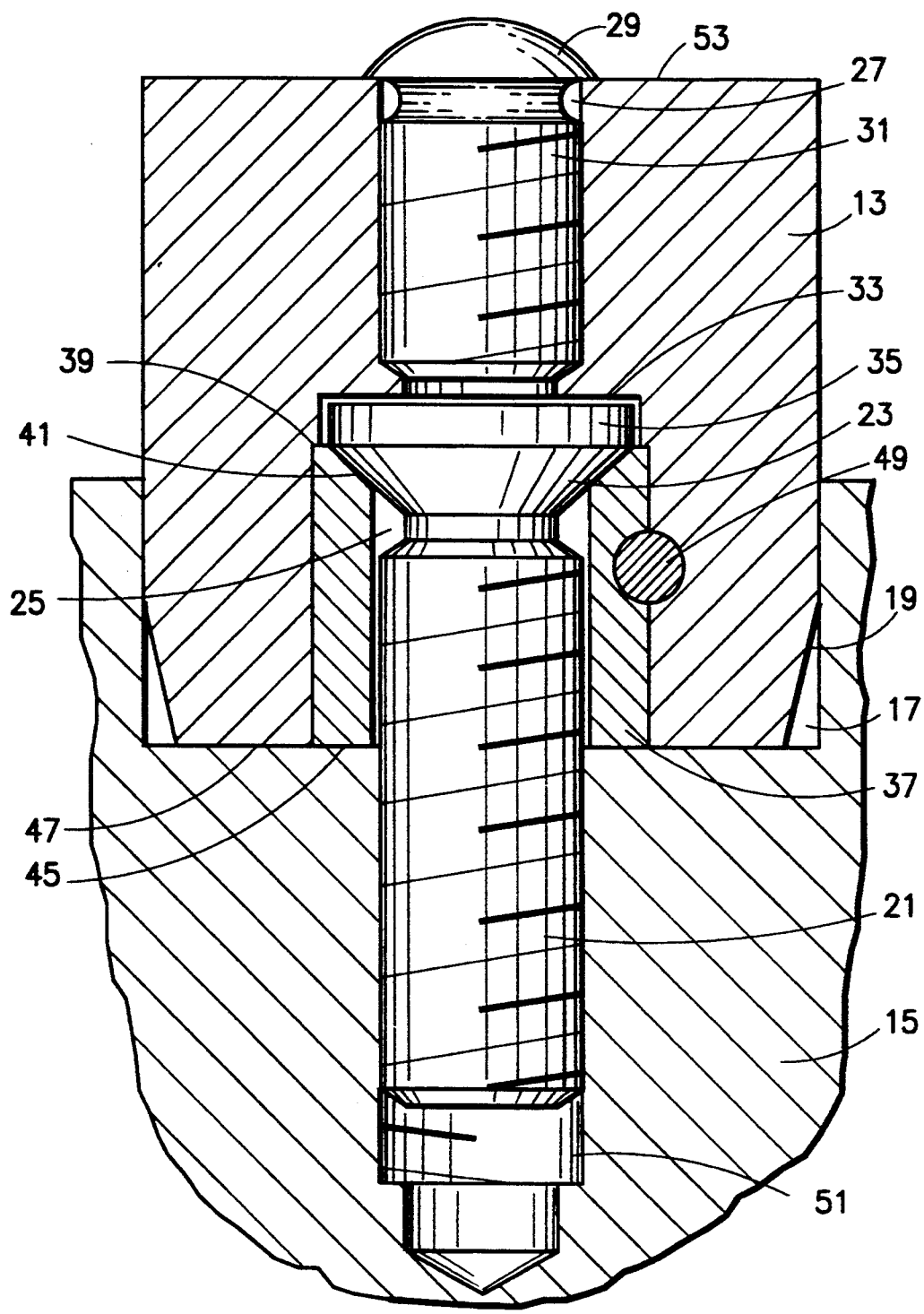
FIG. 1 shows an insert (with a fixation pin for a retaining body of the fastening screw) built into a mold part.

FIG. 1, overall, shows an insert for casting molds by means of which molded parts can be made.

Figure 4:
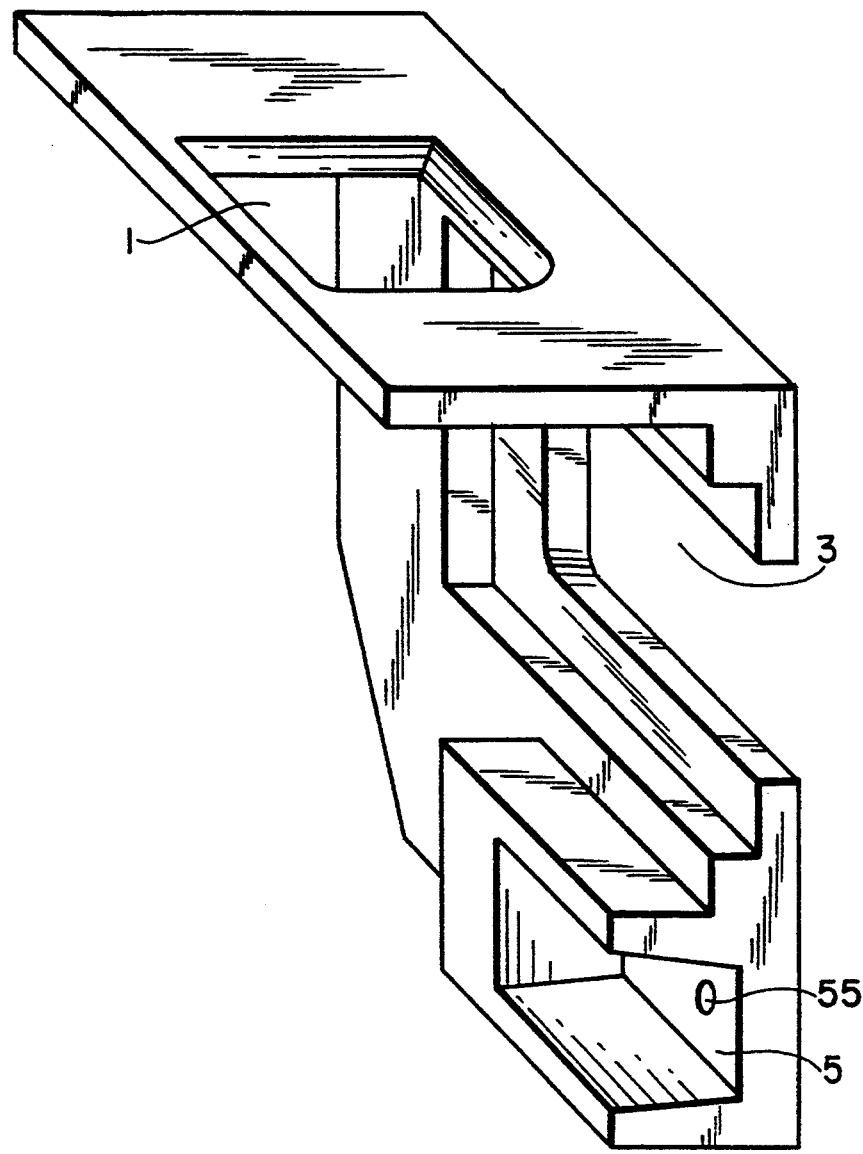
FIG. 4 is a perspective view of a workpiece to be cast with the mold of FIG. 3.

A molded part of this kind is shown overall in FIG. 4. Such a molded part may be produced from castable and injectable materials, and in particular from metals and plastics. Molded parts of this kind are used in many versions as construction parts, housings, etc., in the most various fields in technology. The necessity exists of embodying such molded parts not only as unitary slabs, angled parts, hollow bodies and the like, but attachments and recesses, as shown in FIG. 4 at 1, 3 and 5, must also be provided in such molded parts.

Figure 3:
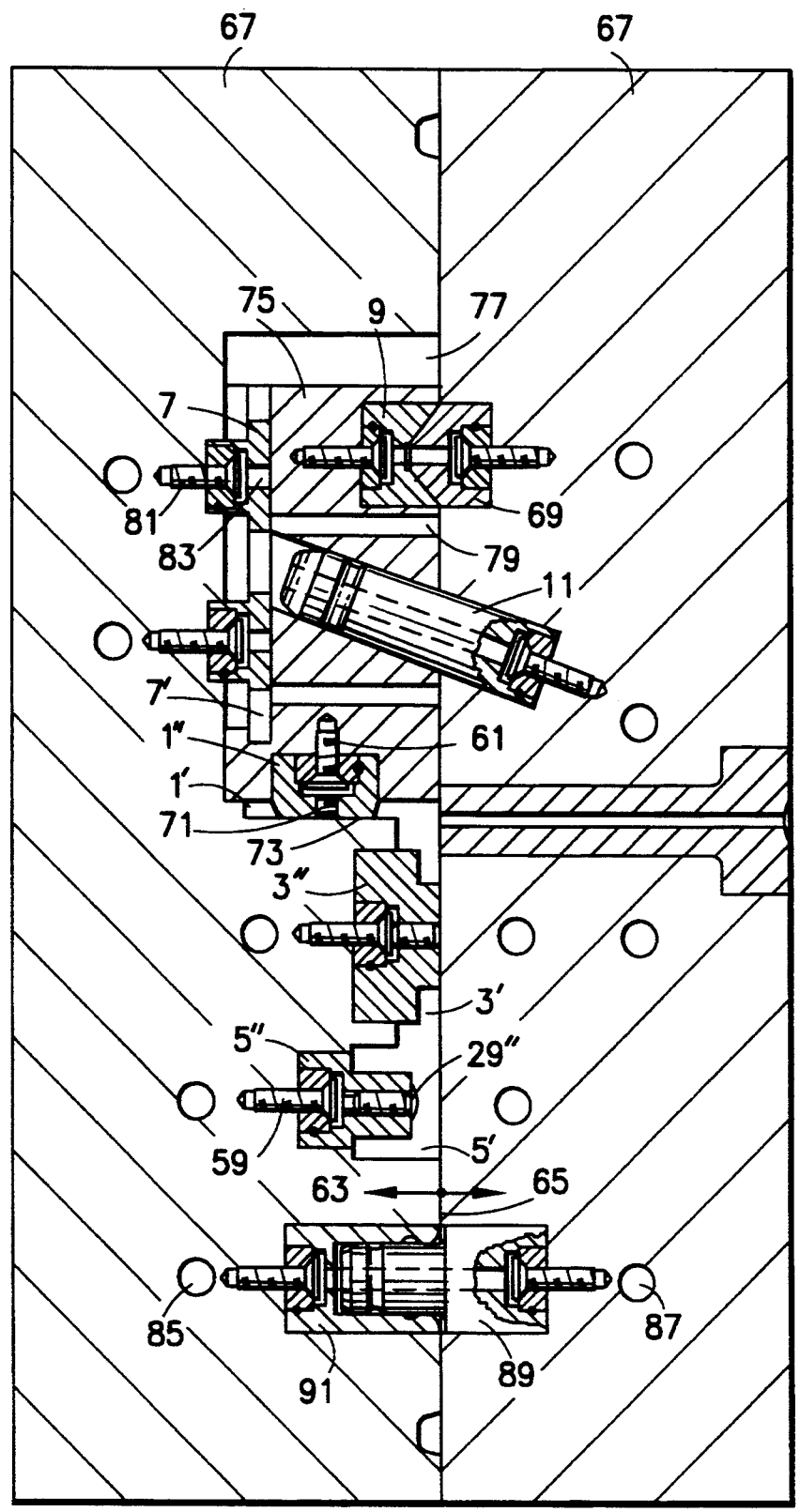
FIG. 3 shows a mold comprising two elements (match plates) with a plurality of built-in inserts.

In FIG. 3, a casting mold is shown, by means of which a molded part having the shape shown in FIG. 4 can be produced. The regions of the mold corresponding to the recesses 1, 3 and 5 of the molded part are marked 1', 3' and 5'. These regions 1', 3' and 5' are thus components of the mold cavity to be filled in casting, and so that these recesses can be produced, corresponding inserts 1", 3" and 5" must therefore be provided in the mold cavity.

In a manner to be described in further detail below, the casting mold shown in FIG. 3 has still other inserts 7, 9, 11, which in a manner to be described in further detail below serve to guide the elements of the mold.

Figure 2:
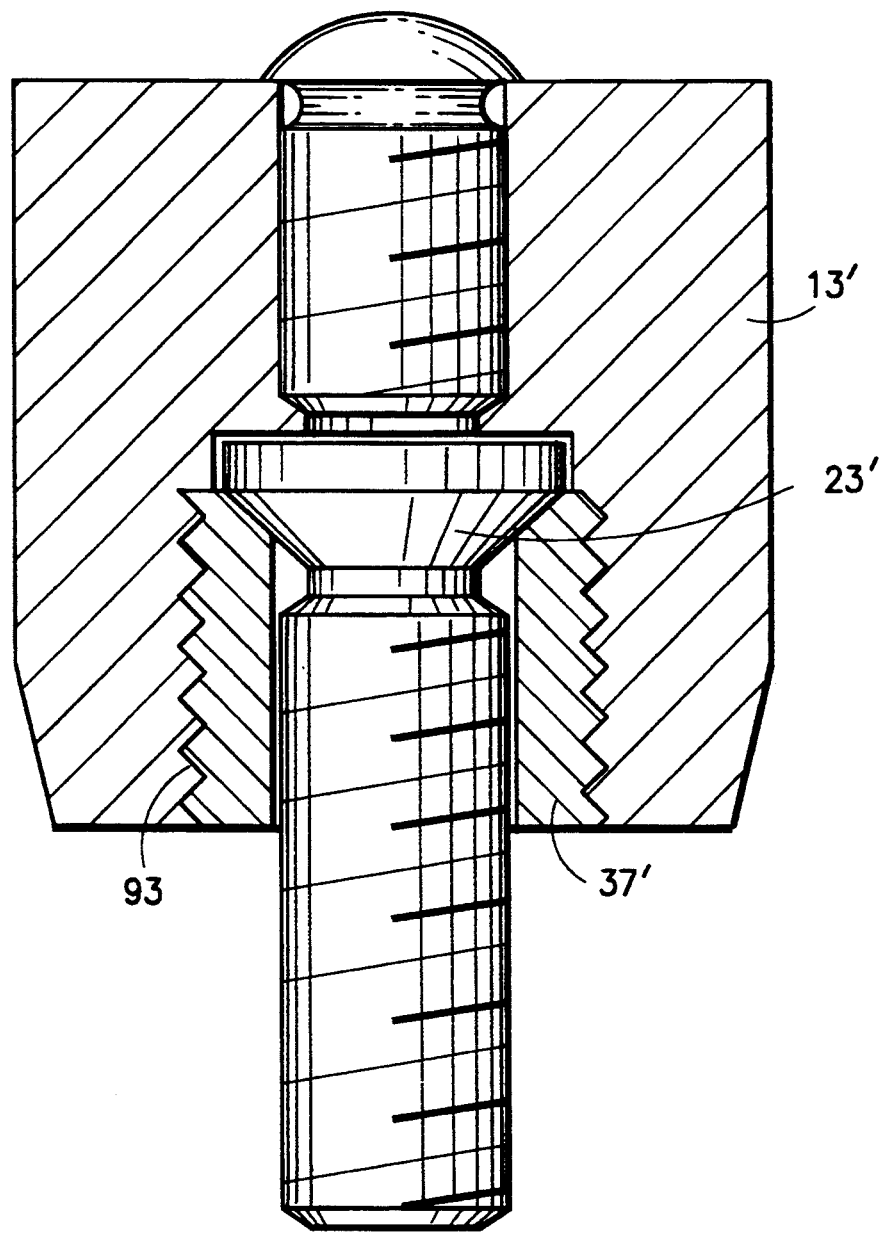
FIG. 2 shows an insert corresponding to FIG. 1 but removed from the mold part (and having a thread for fixation of the retaining body)

The present invention relates to the fastening of inserts of the type in question here to the inner wall of the mold cavity, and FIGS. 1 and 2 show two exemplary embodiments of such inserts, which may for instance be the type of an insert shown at 5" in FIG. 3 for producing a recess in a workpiece.

The insert shown in FIG. 1 has a shaped part 13, the shape of which corresponds to the shaping to be produced for the workpiece. In FIG. 1, 15 indicates the inner wall of the mold cavity of the casting mold, and the shaped piece 13 is let into a corresponding recess 17 of this inner wall. To this end, the shaped piece may have a slight bevel 19.

The shaped piece 13 of the insert is secured to the inner wall 15 by means of a fastening screw 21, which is screwed into the inner wall 21 from the inside of the mold. The fastening screw 21 rests with its head 23 in a cavity 25 of the insert. The cavity 25 of the insert can be reached from the side of the mold hollow via an access bore 27, which can be closed with a fillister head screw 31 having a cap 29. The cavity 25 of the insert, in which the fastening screw 21 is seated, has a shoulder 33 on the side toward the access bore 27, on which shoulder the engagement region of the fastening screw, which is provided with a screw slot 35, can be supported in the direction toward the mold hollow.

In the direction toward the inner wall 15 of the mold, the screw head 23 is supported by means of a ring-shaped retaining body 37, which is supported at one end on a shoulder 39 of the cavity 25. The dimensions of the cavity 25, ring-shaped retaining body 37 and screw head 23, and the disposition of the shoulders 33 and 39, are selected such that the screw head is freely rotatable between the shoulder 33 of the cavity and an oblique shoulder 41 of the retaining body. The end face 45, of the ring-shaped retaining body, located on the side of the mold wall, is flush with the end face 47 of the shaped piece 13 of the insert.

In the embodiment shown in FIG. 1, a fixation pin 49 introduced from the side serves to establish a positive connection between the shaped piece 13 of the insert and the ring-shaped retaining body 37.

To install the insert in the inner wall 15 of the casting mold, the fastening screw 21 is first loosely rotatably joined to the insert by means of the ring-shaped retaining body 37, and the fastening screw 21 can then be actuated through the access bore 27 (which is not yet closed by the fillister heads 31) by means of a screwdriver. A narrow screwdriver can accordingly be introduced through the access bore 27, for instance, and the fastening screw 21 can then be screwed into the thread 51 of the inner wall of the mold until the shaped piece 13 has been pulled all the way into the recess 17. Suitably, the fastening screw 21 may be equipped with a hexagonal socket instead of a screw slot, so that an Allen wrench serves as the screwdriver. Once the shaped piece 13 has been secured in the recess 17 in this way, the access bore 27 is closed by means of the fillister head screw 31, wherein the dimension of the fillister head screw 31 is such that the fillister head forming the cap 29 is flush on its circumference with the outer end face 53. This means that a recess produced in a cast workpiece by means of the shaped piece 13 then has only a flat, fillister-head-shaped countersunk portion, as shown by way of example at 55 in FIG. 4.

The construction of an insert described thus far in conjunction with FIG. 1 is substantially equivalent to the construction of the insert 5" of FIG. 3. It is apparent from this, that this insert is disposed with an axial position of the fastening screw 59 extending parallel to the mold opening direction. Farther up in FIG. 3, the insert 1" can be seen, in which the fastening screw 61 is provided with an axial position extending transversely to the opening direction of the mold. (The opening direction of the mold is indicated in FIG. 3 by the double arrow 63, beginning at the parting plane 65 of the mold.)

It can also be seen from FIG. 3 that the cap 29" of the screw that closes the cavity of the insert provides for closure of the insert cavity in a manner free of undercutting with respect to the mold hollow. In other words, the two elements 67, 67 of the casting mold (the mold halves) can be pulled apart at their parting plane 65, and the resultant workpiece (FIG. 4) can be removed without undesirable anchoring of the workpiece by casting material that might have flowed into undercut hollows. An undercut-free closure of the access bore to the fastening screw of the insert in this way can also be achieved if a complementarily-shaped insert 69 is located opposite the insert 9 shown in FIG. 3, for example, and if the facing face ends of the two inserts supplement one another sealingly, so that the casting material cannot gain access to them.

The insert 1" shown in FIG. 3, which serves to produce the recess 1 of the workpiece of FIG. 4, is disposed with an axial position of the fastening screw 61 extending transversely to the opening direction of the mold. In the case of this insert, an undercut-free closure of the access bore 71 is assured by the fact that the face end of this insert rests sealingly on the wall portion 73 of the mold when the mold is closed, so that once again no casting material can intrude into the access bore.

To this end, the insert 1" is seated on a slide 75, supported on one mold half and shiftable by means of a diagonal-tension element, provided in the other mold half, in the form of the further insert 11. The inserts 7 and 7' are T guides, and a slide movement space is indicated at 77 in FIG. 3. If the two mold halves 67 are separated from one another or moved toward one another in the direction of the double arrow 63, then the diagonal-tension element formed by the slide 11 shifts the slide 75 in such a way that the slide 75 pushes the insert 1", forming the recess 1 of the workpiece, upward out of the workpiece while it is still in the mold, and the tool can then be removed.

If the two mold halves upon closure of the mold move toward one another as indicated by the double arrow 63, then the diagonal-tension element in the form of the insert 11 shifts the slide 75 such that it can execute the function assigned to it as a shaping element for the recess 1 of the workpiece and can also seal off the access bore 71 in a manner free of undercutting by contacting the wall portion 73. The motion of the slide 75 by means of the diagonal-tension element embodied by the insert 11 also assures that the access bore 79 is aligned in the required manner with the fastening screw 81 of the insert 7. In this process, the slide 75 assures closure of the access bore 83 of the insert 7.

The fastening of the inserts as described from the inside of the mold also makes it possible to provide cooling bores and tempering conduits of the type indicated at 85 and 87 for the mold elements, without the possibility that fastening screws, brought into the inserts from the outside of the mold, could intersect one another.

Inserts installed as described above from the inside of the mold may also be formed for the installation of a guide column 89 and a corresponding guide bush 91, or may be formed as a thrust piece like the insert 9 for other purposes as well, in which additional parts, or parts that have to be changed depending on the application, can be installed on the inside of a mold hollow. Thus, according to the present invention, recesses of variable size can be produced in workpieces without difficulty, simply by replacing one corresponding insert with another. The shaping and size of the insert to be provided on the mold hollow do not depend on the described fastening type.

The construction described also has the advantage that the fastening screw 21, in addition to its function as a fastening element for the insert, serves as a drive means for pulling the insert into the recess 17 and forcefully driving the insert out of the recess 17. This action is the result of the above-explained support of the head of the fastening screw on the two shoulders 33 and 41.

The dimensions of the fastening screw 21 and of the fillister-head screw 31 can also be of such a size that the latter, in the inserted state, rests as a counter screw on the head of the fastening screw. Depending on the application, the fillister-head screw 31 may also be replaced simply by a stopper, or some other undercut-free closure for the access bore 27.

FIG. 2 shows a structurally modified embodiment, in which the ring-shaped retaining body 37', for positive securing in the insert 13', is provided not with a fixation pin (such as 49 in FIG. 1) but with a thread 93, such that the head 23' of the fastening screw 23" is supported on both ends, while loose rotatability is retained.

By using inserts of the type described above, casting molds with extensive variability in terms of the mold hollow for the workpieces to be produced can be made in a favorable manner with variably installed guide pieces, guide columns, and the like as well.

I claim:

1. A removable insert for a casting mold, having
a fastening screw (21) for fastening the insert (13) in a hollow defined by said mold (15), the screw (21) being movable between an unsecured position and a fastening position by means of a screwdriver engaging an engagement region (35) of said screw (21),
wherein
the engagement region (35) of the fastening screw (21) is oriented toward the hollow of the mold, and the fastening screw, in said fastening position, engages in an inner wall (15, 51) of the hollow of the mold,
the insert (13) has a cavity (25) for the fastening screw (21), in which the fastening screw is supported and which is accessible to the screwdriver from the hollow of the mold,
the cavity (25) receiving the fastening screw (13) is closable (29, 31) in a manner free of undercutting with respect to the hollow of the mold;
the fastening screw (21) is supported axially both ends in the cavity (25) of the insert (13);
the fastening screw (21) has a head (23) which is received rotatably between two axially opposed shoulders (33, 41) of the insert (13), which limit axial movement of said screw, and actuation of said screw by rotating said head in one of two predetermined rotational directions, selectively driven the insert (13) toward or away from the wall (15) of the casting mold.

2. The insert of claim 1,
wherein
the shoulder (41) supporting the head of the fastening screw (21) on the side of the wall of the casting mold is formed on a retaining body (37) fastened in the insert (13).

3. The insert of claim 2,
wherein
the retaining body is a ring (37), the axial position of which in the insert is defined releaseably or non-releaseably by positive engagement by means of a fixation pin.

4. The insert of claim 1,
wherein
the cavity (25) of the insert receiving the fastening screw is closable by means of a cap (29) that rests flush on an outer end face (53) of the insert (13).

5. The insert of claim 4,
wherein the cap is formed by a fillister head (29) of an additional screw (31).

6. The insert of claim 1, wherein
the insert is disposed with an axial position of the fastening screw extending parallel to the direction of mold opening.

7. The insert of claim 1,
wherein
the insert is disposed with an axial position of the fastening screw extending transversely to an opening direction of said mold.

8. The insert of claim 1,
wherein
the insert is disposed with its end face (53) having an access opening (27) to the cavity (25) in a position in which the end face (53) is sealable against a mating surface by a closing motion of elements of the mold.

9. The combination of a casting mold (15) for producing molded parts and a removable insert (13) for said mold, having
a fastening screw (21) for fastening the insert (13) in a hollow defined by said mold (15), the screw (21) being movable between an unsecured position and a fastening position by means of a screwdriver engaging an engagement region (35) of said screw (21),
wherein
the engagement region (35) of the fastening screw (21) is oriented toward the hollow of the mold, and the fastening screw, in said fastening position, engages in an inner wall (15, 51) of the hollow of the mold,
the insert (13) has a cavity (25) for the fastening screw (21), in which the fastening screw is supported and which is accessible to the screwdriver from the hollow of the mold,
the cavity (25) receiving the fastening screw (13) is closable (29, 31) in a manner free of undercutting with respect to the hollow of the mold;
the fastening screw (21) is supported axially on both ends in the cavity (25) of the insert (13);
the fastening screw (21) has a head (23) which is received rotatably between two axially opposed shoulders (33, 41) of the insert (13), which limit axial movement of said screw and actuation of said screw by rotating said head in one of two predetermined rotational directions, selectively drives the insert (13) toward or away from the wall of the casting mold (15).

* * * * *

UNITED STATES PATENT AND TRADEMARK OFFICE
CERTIFICATE OF CORRECTION

PATENT NO. : 5,387,096
DATED : February 7, 1995
INVENTOR(S) : WIESER

It is certified that error appears in the above-indentified patent and that said Letters Patent is hereby corrected as shown below:

Title page, Item [76] Inventor,

"Marinna" should be --Marianne--

Column 5, line 31 (claim 1), after "axially" insert --on--

Column 5, line 38 (claim 1), "driven" should be --drives--

Signed and Sealed this

Seventeenth Day of September, 1996

Attest:

BRUCE LEHMAN

Attesting Officer     Commissioner of Patents and Trademarks